July 2, 1968  E. R. FEHLBERG ET AL  3,391,009
MANUFACTURE OF CONCENTRATED FRUIT JUICE
Filed July 2, 1964
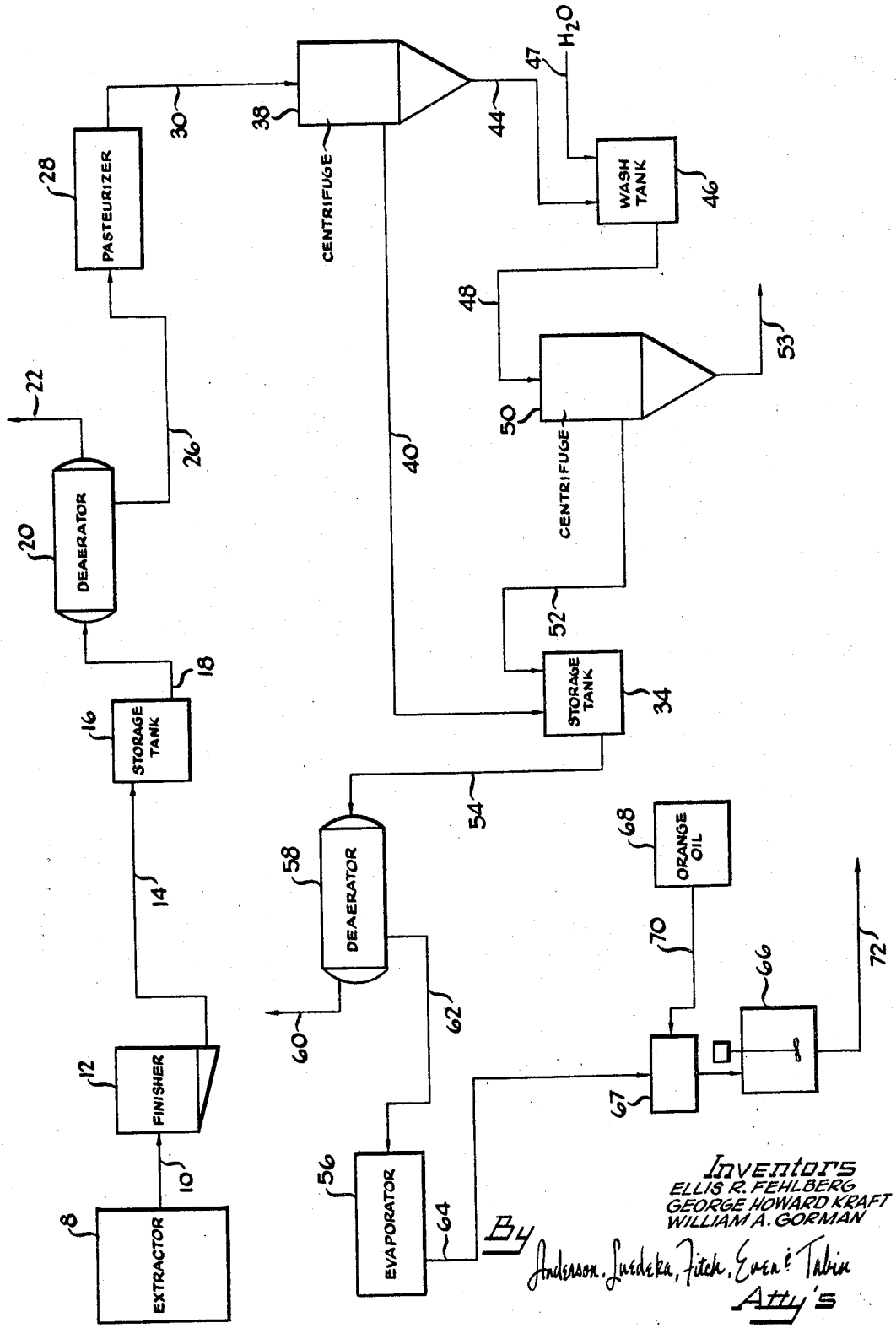
Inventors
ELLIS R. FEHLBERG
GEORGE HOWARD KRAFT
WILLIAM A. GORMAN
By Anderson, Luedeka, Fitch, Even & Tabin
Atty's //ed States Patent Office 3,391,009
Patented July 2, 1968

3,391,009
MANUFACTURE OF CONCENTRATED
FRUIT JUICE
Ellis R. Fehlberg, Lakeland, Fla., and George Howard Kraft, Wilmette, and William A. Gorman, Lake Bluff, Ill., assignors to National Dairy Products Corporation, New York, N.Y., a corporation of Delaware
Filed July 2, 1964, Ser. No. 379,874
1 Claim. (Cl. 99—205)

ABSTRACT OF THE DISCLOSURE

Method for the manufacture of an orange juice concentrate, which method comprises extracting orange juice from oranges, deaerating and heating the juice, adjusting the pulp content of the juice to less than 8 percent pulp, concentrating the juice to provide an orange juice concentrate of at least about 60° Brix, and stabilizing the orange juice concentrate by adding a minor amount of orange oil, or emulsion thereof, to the concentrate.

---

This invention relates generally to a method for the manufacture of concentrated fruit juice, and more specifically relates to a method for the manufacture of highly concentrated fruit juice of low viscosity wherein increased yields of the highly concentrated fruit juice are obtained.

Concentrated fruit juices, e.g., orange juice, are well known, and many processes are available for the manufacture of concentrated orange juice whereby a four-fold concentrated orange juice is provided. Orange juice concentrates of this type are of a relatively low viscosity and are about 42 degrees Brix. 42 degrees Brix orange juice concentrates are known as 3 plus 1 concentrates denoting that one part of the concentrated juice is mixed with three parts of water to provide a reconstituted orange juice.

3 plus 1 orange juice concentrate has been made in various ways but is usually made by concentrating orange juice to between about 50 degrees Brix to 60 degrees Brix, and then adding fresh single strength juice (known as "cut back" juice) to the concentrated juice to obtain a 42 degree Brix orange juice concentrate. The addition of single strength "cut back" juice provides the orange juice concentrate with desired flavor and aroma.

It would be desirable to provide orange juice concentrates of higher concentration. However, orange juice concentrates of about 60 degrees Brix made in accordance with conventional processes generally become gelatinous or set upon storage and are not easily reconstituted with water. Further, orange juice concentrates of above about 60 degrees Brix made in accordance with conventional processes are highly viscous and cannot be easily processed. Various attempts have been made to provide highly concentrated fruit juice concentrates which are non-gelatinous and which have a low viscosity. Known processes for producing highly concentrated fruit juices which can be reconstituted satisfactorily, for example, an orange juice concentrate which is eight-fold concentrated (7 plus 1), do not generally provide high yields.

The term "yield" as used herein is employed in the manner of the citrus industry. In the citrus industry, one-half box of citrus fruit from each 500 boxes of fruit utilized as raw material is extracted using a small standard juice extractor and the volume of juice obtained is measured. The percent "yield" obtained in a commercial fruit juice extraction process is the amount of juice extracted in the commercial process as compared to the amount of juice extracted using the standard extractor. It can be seen that by obtaining more efficient extraction in the commercial process, yields in excess of 100 percent may be obtained.

It is a principal object of the present invention to provide an improved method for the manufacture of concentrated fruit juice. Another object is to provide an increased yield of a highly concentrated fruit juice of low viscosity. Yet another object is to provide a highly concentrated fruit juice which does not substantially increase in viscosity upon extended storage. A further object is to provide a high yield of above about 60 degrees Brix fruit juice which is nongelatinous and which is easily reconstituted with water. A still further object is to provide a high yield of above about 60 degrees Brix orange juice concentrate having an acceptable flavor and aroma without employing cut back juice.

Other objects and advantages of the present invention will become apparent from the following detailed description, and from the accompanying drawing which is a schematic flow diagram of a specific embodiment of the method of the present invention.

Very generally, the present invention relates to a method for the manufacture of high Brix fruit juice concentrates of low viscosity which are readily reconstituted with water. More specifically, the invention relates to a method for the manufacture of an orange juice concentrate, which method comprises extracting orange juice from oranges, de-aerating and heating the juice, adjusting the pulp content of the juice to less than 8 percent pulp and usually to between about 4 percent and about 8 percent, concentrating the juice to provide an orange juice concentate of at least about 50 degrees Brix and stabilizing the juice concentrate by adding a minor amount of orange oil, or emulsion thereof, to the concentrate.

As used herein, the perecent pulp present in the orange juice is the volumetric percent of pulp in an orange juice sample, determined by centrifuging a sample of orange juice under selected conditions specified to the industry by the United States Department of Agriculture. The percent pulp in orange juice is commonly measured in accordance with this procedure.

It has been discovered that when an orange juice concentrate is manufactured in accordance with the described method, a high yield of at least about 50 degrees Brix orange juice concentrate is obtained which has a viscosity below about 10,000 cps. The viscosity of the orange juice concentrate does not substantially increase when stored and the orange juice concentrate does not gel upon extended storage. The concentrate is easily reconstituted with water to provide a reconstituted orange juice having an acceptacle color, flavor and aroma which does not require the addition of cut back juice, though cut back juice may be utilized. The described method is particularly suited for manufacturing 72 degree Brix orange juice, i.e., 7 plus 1 orange juice concentrate.

Referring to the single drawing, there is shown a schematic flow diagram of a specific embodiment of the method of the invention, which is particularly suited for the manufacture of 72 degree Brix orange juice concentrate. Single strength orange juice is extracted from oranges in a conventional fruit juice extractor 8 and passed through line 10 into a finisher 12. The finisher 12 removes a portion of the pulp in the orange juice as well as undesirable rind and seeds that may be present in the juice. The finisher 12 is operated at a pressure of between about 10 p.s.i.g. and about 40 p.s.i.g., depending, in part, upon the size of the screening, the finisher and the character of the juice from the extractor, in order to obtain orange juice containing the desired amount of pulp. As the pulp content of the orange juice exiting from the finisher is reduced, the yield of orange juice is also reduced. The finisher is normally operated so as to provide an optimum yield of juice containing a controlled amount of pulp. Generally, in order to obtain high yields of 50 degrees Brix or higher orange juice concentrate, the finisher is adjusted to obtain orange juice containing about 10 to about 16 percent pulp, preferably about 12 percent to about 14 percent. It has been found that optimum yields of orange juice concentrate are obtained when the orange juice obtained from the finisher contains an amount of pulp within this range.

The orange juice passes out of the finisher 12 through a line 14 and is directed into a storage tank 16. The orange juice is removed from the storage tank 16 through a line 18 and is passed into a de-aerator 20.

The de-aerator 20, which is connected to a vacuum source by a line 2, is operated at a reduced pressure sufficient to remove a substantial portion of the air present in the orange juice. Generally, the de-aerator 20 may be operated at a vacuum corresponding to a pressure of about 3 inches of mercury absolute. It has been found that the removal of air from the orange juice at this point in the process materially aids in preventing deterioration of the flavor and aroma of the orange juice in subsequent process steps.

The de-aerated orange juice is withdrawn from the de-aerator 20 through a line 26 and is heated to a temperature between about 100 degrees F. and about 120 degrees F. Generally, this heating of the orange juice is a part of pasteurization of the juice, and as shown in the drawing the orange juice is introduced into a pasteurizer 28, which may be a standard pasteurizer commonly utilized in the fruit juice and milk industries. For example, the pasteurizer 28 may be a plate and frame pasteurizer having a cooling section, which is operated under regenerative conditions in order to heat the orange juice to 195 degrees F. to 200 degrees F. for three seconds after which the juice is cooled to between about 100 degrees F. and about 120 degrees F. Alternately, other types of pasteurizers may be employed or the orange juice may be heated to about 100 degrees F. to about 120 degrees F. in a suitable heat exchanger without pasteurizing the juice.

It has been discovered that it is highly desirable to provide orange juice which, prior to concentration, has a pulp content between about 4 percent and about 8 percent, preferably about 5 percent to about 6 percent. If the pulp content of the orange juice which is concentrated exceeds about 8 percent, an orange juice concentrate product of at least about 50 degrees Brix will gel or set upon storage and will not be easily reconstitutable. Further, the viscosity of the orange juice concentrate may be high or may increase substantially upon storage. However, if the pulp content of the orange juice is reduced to within the indicated range prior to concentration thereof, a non-gelatinous orange juice concentrate of at least about 50 degrees Brix will be obtained which has a low viscosity, i.e., below about 10,000 cps. The viscosity of the concentrate will not increase substantially upon storage and the concentrate will be easily reconstitutable.

Since it has been found that maximum yields of orange juice concentrate are obtained when the orange juice from the finisher 12 contains about 10 to about 16 percent pulp, the pulp content of the orange juice must be reduced to between about 4 percent and about 8 percent prior to concentration thereof. Although other means of separating pulp from the orange juice are contemplated, the use of a centrifuge is considered to be most desirable. In this connection, a conventional continuous cone centrifuge is employed.

The pasteurized orange juice is cooled to about 110 degrees F. in the cooling section of the pasteurizer 28 and is passed through a line 30 into a centrifuge 38. It has been discovered that in order to obtain effective separation of the pulp from the orange juice in the centrifuge 38, and to obtain high yields of orange juice concentrate, the pasteurized juice should desirably enter the centrifuge 38 at a temperature in excess of 100 degrees F., preferably about 110 degrees F. However, the temperature of the orange juice entering the centrifuge 38 desirably does not exceed 120 degrees F., as extended exposure to elevated temperature above 120 degrees F. is undesirable.

The centrifuge 38 is operated so as to provide an orange juice containing about 4 to about 8 percent pulp which passes out of the centrifuge 38 through a line 40 and is delivered into a storage tank 34. As discussed, it has been found that the centrifuge 38 should desirably be operated so as to reduce the solid content of the juice to below about 8 percent in order to prevent gelation of the concentrated fruit juice product. The pulp separated from the orange juice is removed from the centrifuge in the form of a sludge having a thick consistency and is delivered through a line 44 to a wash tank 46. The pulp is mixed and washed with water from a line 47 under agitation in the wash tank 46. Any amount of water sufficient to effect washing of the pulp sludge may be utilized and, in this connection, three parts of water per one part of pulp sludge has been found to be desirable. The washed pulp and water slurry is passed out of the wash tank 46 through a line 48 and is delivered into a second centrifuge 50 wherein the slurry is centrifuged to provide a wash water centrifugate containing about 4 to 8 percent pulp. The centrifugate is passed through line 52 into the storage tank 34 where it is mixed with the orange juice obtained from the centrifuge 38. The pulp separated in the centrifuge 50 is discarded through a line 53.

It has been discovered that the washing of the pulp separated in the centrifuge 38 with water and the addition of the wash water to the orange juice from the centrifuge 38 substantially increases the yield obtained by the described process.

The combined orange juice and centrifugate mixture are passed out of the storage tank 34 through a line 54 and are concentrated in an evaporator 56. As shown in the drawing, it is desirable to de-aerate the juice in a de-aerator 58 prior to concentration thereof. The de-aerator 58 is connected to a suitable vacuum by a line 60. Any deleterious air present in the orange juice mixture is removed in the de-aerator 58. It is generally desirable to establish in the de-aerator 58 a vacuum corresponding to an absolute pressure of less than about 3 inches of mercury, preferably about 1 inch of mercury, in order to substantially remove all deleterious air and to prevent deterioration of the flavor of the concentrated orange juice. The orange juice mixture is withdrawn from the de-aerator 58 through a line 62 and is introduced into the evaporator 56 in which the orange juice is concentrated.

Several available evaporators may be utilized to effect concentration of the orange juice. A particular evaporator that has been found to be suitable is a double-effect evaporator in which the first effect comprises a single stage and the second effect comprises two stages. The orange juice may be concentrated to about 27 degrees Brix in the first effect at a temperature of about 93 degrees F. The juice is then concentrated in the first stage of the second effect to about 50 degrees Brix at a temperature of about 68 to about 73 degrees F. The juice is then introduced into the second stage of the second effect where it is concentrated to about 72 degrees Brix at a temperature of about 78 degrees F. to about 80 degrees F. It is contemplated that other evaporators may be employed and it is considered to be within the skill of the art to provide an evaporator which may be utilized to concentrate orange juice to any suitable Brix above 50 degrees Brix, e.g., 72 degrees Brix, as may be desired. Of course, the juice should be conditioned so as to prevent inefficient operation of the evaporator.

The orange juice concentrate is withdrawn from the evaporator 56 through a line 64 and is delivered into a mixing tank 66. In the line 64 is placed an automatic, continuous, in-line blender 67 by which orange oil is metered to and mixed with the concentrate. The mixing tank 66 is suitably cooled, as by the use of refrigerated cold walls, to cool the concentrated orange juice to about 50 degrees F. and the tank is provided with suitable agitating means, as shown in the drawing.

Orange oil for the in-line blender 67 is withdrawn from an orange oil storage tank 68 and is delivered through line 70 into the continuous in-line blender 67 where it is mixed with the orange juice concentrate to stabilize the concentrated juice.

Orange oil is a commercially available cold pressed product, which has, in the past, been conventionally added to orange juice concentrates of low Brix to increase their flavor. Orange oil comprises about 98 percent d-limonene and about 1.65 percent aldehydes. The orange oil is added in an amount between 0.15 percent and about 0.25 percent by volume of the orange juice concentrate. It has been observed that the presence of the orange oil in the orange juice concentrate acts to maintain low viscosity in the concentrate and, if the orange oil is not added to the orange juice concentrate, it has been found that the concentrate will often gel or set on storage and is not readily reconstituted with water. It is believed that the orange oil provides a surfactant effect when added to orange juice concentrates of high Brix value. Although orange oil has been conventionally added to orange juice concentrates heretofore, the surfactant effect of the orange oil has not been recognized. The orange juice concentrate is withdrawn from the mixing tank 66 through a line 72 and is delivered to suitable conventional canning and/or packaging apparatus. The orange oil may be added in the form of an emulsion, if desired.

Example I

A 72 degree Brix orange juice concentrate is manufactured in a continuous process by extracting the juice from oranges in a conventional fruit juice extractor. The extractor is operated at 90 p.s.i.g. to provide 33 gallons of single strength orange juice per minute. The orange juice obtained from the extractor is finished in a finisher having 0.020 inch finisher screens at a pressure of 95 p.s.i.g. The orange juice obtained from the finisher contains 12 percent pulp.

The orange juice is passed into a deaerator which is maintained at 3 inches of mercury absolute and air is removed from the orange juice. The de-aerated orange juice is passed into a plate and frame pasteurizer and is pasteurized by heating the juice to a temperature of 195 degrees F. to 200 degrees F. for 3 seconds. The juice is cooled to 110 degrees F. in the cooling section of the pasteurizer and the pasteurized juice is introduced into a continuous centrifuge which is operated at 40 p.s.i.g. back pressure. About 32.6 gallons per minute of orange juice is obtained from the centrifuge which contains 5 percent to 6 percent pulp.

The pulp sludge from the separated orange juice in the centrifuge is removed from the centrifuge and mixed with 3 volumes of water per volume of pulp sludge in a mixing tank. The water and pulp slurry is centrifuged in a centrifuge operated at a back pressure of 40 p.s.i.g. to provide about 1.2 gallons per minute of pulp-wash liquor containing 5 percent to 6 percent pulp which is mixed with the orange juice in a storage tank. The mixed orange juice and pulp-wash liquor are passed into a de-aerator which is operated at a pressure of 1 inch of mercury absolute. The de-aerated orange juice mixture is then introduced into a double effect evaporator having a single stage in the first effect and two stages in the second effect. The flow rate of the orange juice mixture to the evaporator is about 33 gallons per minute.

The orange juice mixture is concentrated to 27 degrees Brix in the first effect of the evaporator at a temperature of 76 degrees F. The orange juice mixture is further concentrated to 50 degrees Brix at a temperature of 75 degrees F. in the first stage of the second effect after which it is introduced into the second stage of the second effect of the evaporator where it is concentrated to 72 degrees Brix at a temperature of 83 degrees F. The evaporator withdraws 11,000 pounds of water vapor per hour from the orange juice mixture.

The orange juice concentrate obtained from the evaporator is introduced into a cold wall mixing tank where it is cooled to 50 degrees F. To the concentrate is added 0.20 percent of orange oil with agitation in the mixing tank to stabilize orange juice against gelling and setting.

The stabilized orange juice concentrate is withdrawn from the cold wall mixing tank and is transferred to conventional canning apparatus where it is canned. The orange juice concentrate may be stored at 10 degrees F. for a period of as much as 12 months and reconstituted with 7 parts of water per part of concentrate. The orange juice concentrate is readily reconstituted with water and provides a reconstituted orange juice which has an acceptable flavor and aroma.

Example II

An orange juice concentrate is manufactured in accordance with Example I, except that the orange juice is heated to 110 degrees F. without being pasteurized prior to being introduced into the first centrifuge. The orange juice concentrate obtained is easily reconstituted with water after being stored for as much as 12 months at 10 degrees F. and is considered to have an equivalent aroma and flavor to the reconstituted orange juice of Example I.

It can be seen that a method has been provided for the manufacture of a high Brix orange juice concentrate having a low viscosity which is readily reconstituted with water after extended storage. The orange juice concentrate is obtained in increased yields when compared to known processes and the orange juice concentrate obtained retains its low viscosity after extended storage.

Although certain of the features of the invention have been described with particularity, it is contemplated that other embodiments may be utilized which are within the skill of the art.

Various of the features of the invention are claimed in the following claim.

What is claimed is:

1. A method for the manufacture of concentrated fruit juice, which method comprises extracting orange juice from oranges, adjusting the pulp content of said juice to between about 12 percent and about 14 percent, de-aerating said juice, pasteurizing said juice and thereafter cooling said juice to a temperature of about 110 degrees F., centrifuging said juice at said temperature to separate a portion of pulp from said juice and to provide an orange juice filtrate containing about 5 percent to about 6 percent pulp, washing the separated pulp with water and centrifuging the water and pulp mixture to provide a wash water containing about 5 percent to about 6 percent pulp, combining the wash water and orange juice filtrate, de-aerating said combined wash water and orange juice filtrate, concentrating said combined wash water and orange juice filtrate to provide an orange juice concentrate of at least about 60 degrees Brix, whereby an increased yield of at least 60 degrees Brix orange juice concentrate of low viscosity is provided.

References Cited

UNITED STATES PATENTS 3,118,770  1/1964  Harrell _____ 99—206
3,300,320  1/1967  Distelkamp et al. _____ 99—105

OTHER REFERENCES

Heid, "Modern Technics Produce Quality Citrus Products," Food Industries, June 1945, pages 626–629.

A. LOUIS MONACELL, *Primary Examiner.*

HYMAN LORD, *Examiner.*

M. VOET, *Assistant Examiner.*